2 Sheets--Sheet 1.

W. W. CAREY & G. W. HARRIS.
Improvement in Sawing-Machines.

No. 128,461.

Patented July 2, 1872.

Witnesses.

W. W. Carey & G. W. Harris.

by their attorney

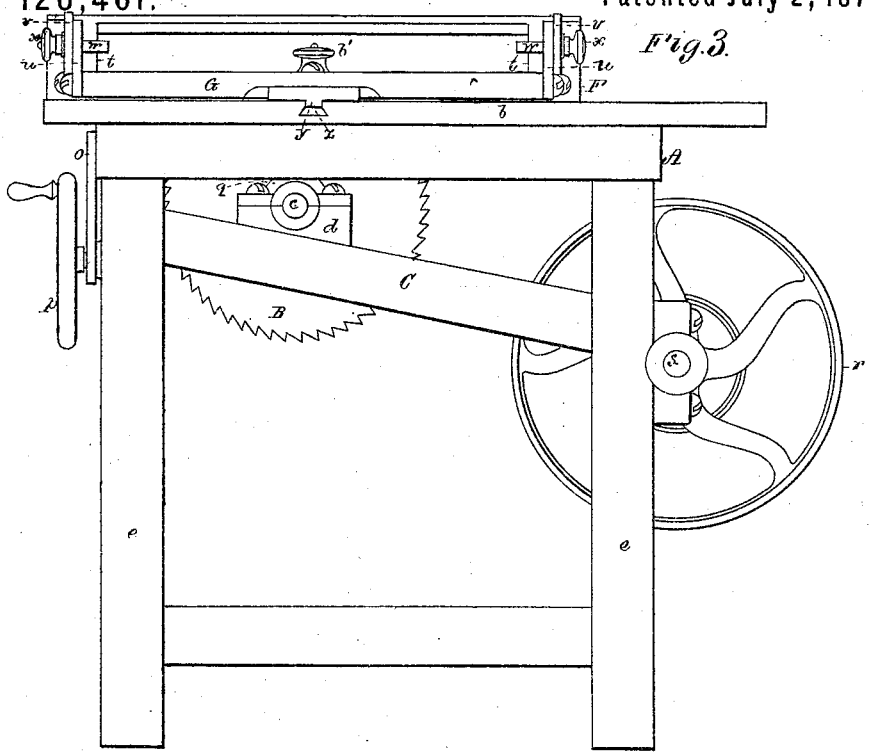
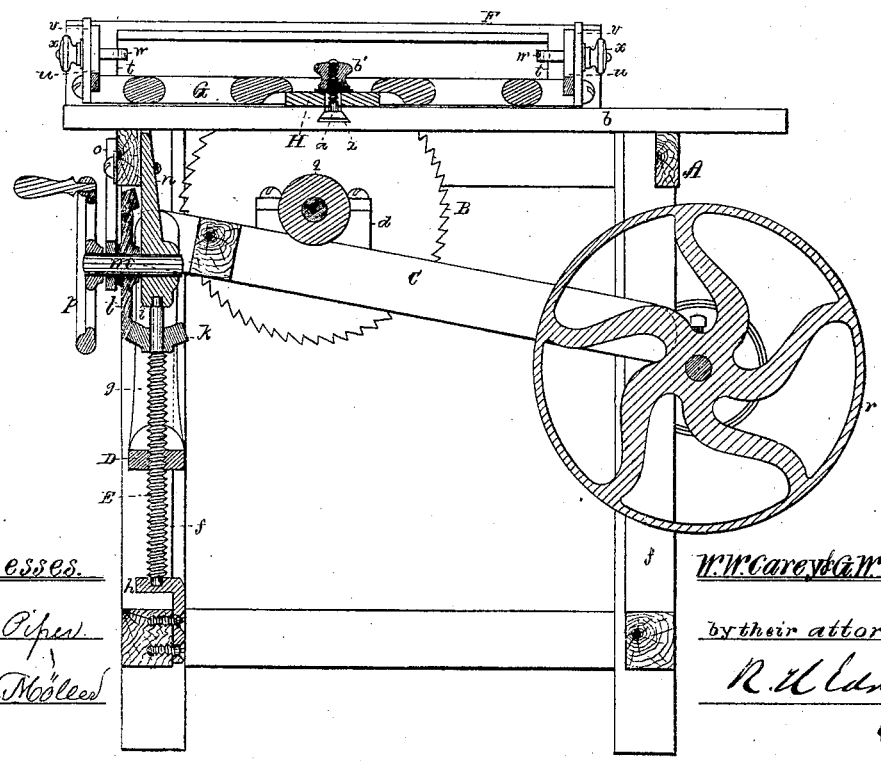

UNITED STATES PATENT OFFICE.

WILSON W. CAREY AND GEORGE W. HARRIS, OF LOWELL, MASS.

IMPROVEMENT IN SAWING-MACHINES.

Specification forming part of Letters Patent No. 128,461, dated July 2, 1872.

*To all persons to whom these presents may come:*

Be it known that we, WILSON W. CAREY and GEORGE W. HARRIS, of Lowell, of the county of Middlesex and State of Massachusetts, have invented a new and useful Improvement in Sawing-Machines; and do hereby declare the same to be fully described in the following specification and represented in the accompanying drawing, of which—

Figure 1:
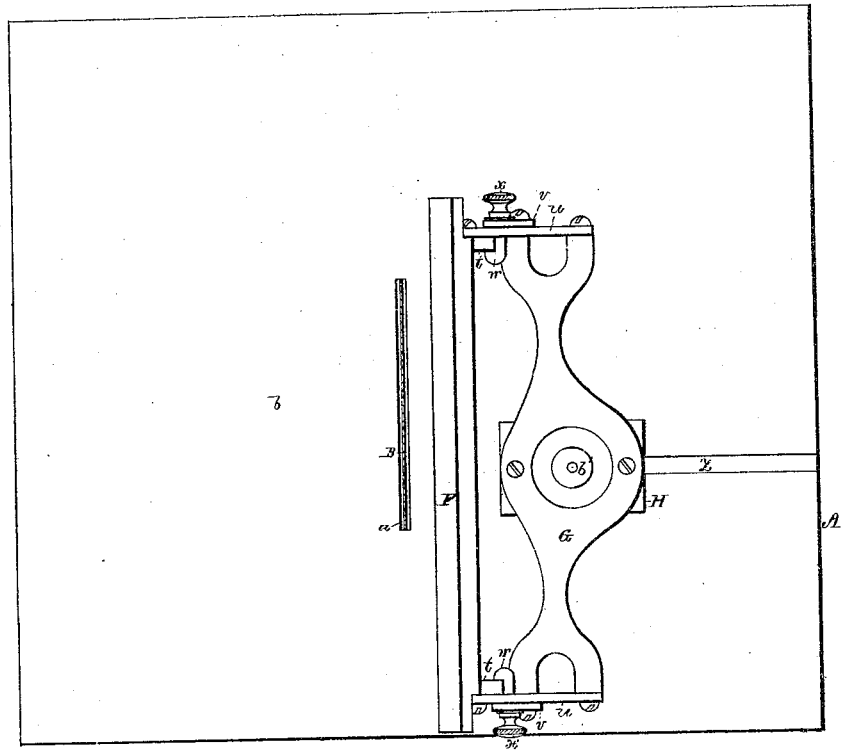
Figure 2:
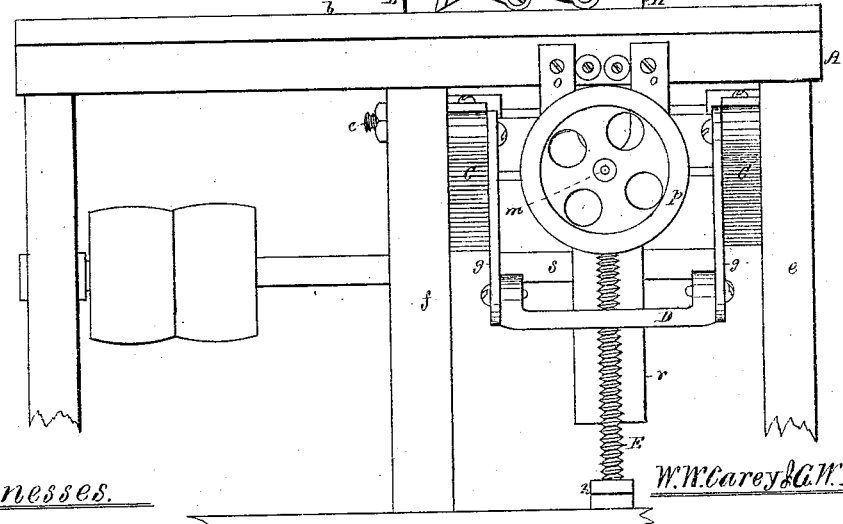

Figure 1 is a top view, Fig. 2 a front elevation, Fig. 3 a side view, and Fig. 4 a vertical and transverse section, of our improved machine, the said section being taken through the screw for adjusting the saw-carrier.

Our invention has reference to the devices for supporting the circular saw and adjusting it relatively to the table-top; also to the stuff-gauge and its adjustments. The peculiar saw-supporting and adjusting mechanism consists of a pivoted frame, two connection-bars, a rocker-bar, and a vertical screw and its operative mechanism, combined and arranged together in a table, and applied to it and a circular saw, in manner as hereinafter described. Our peculiar mechanism for adjusting the stuff-gauge with respect to the table-top consists of two hooked clamp-screws, (provided with nuts,) two curved and slotted arms, two other arms, and two curved projections, as constructed, arranged, and applied to the said gauge, and an adjustable bar, all as hereinafter explained and as represented.

In the drawing, A denotes the table, and B the circular saw, the latter being arranged in a slot, $a$, formed in the table-top $b$. The saw is fixed on the inner end of a horizontal shaft or arbor, $c$, supported in boxes or bearings $d$ $d$ carried by a frame, C. The frame C is arranged nearly horizontal, within the table, in manner as shown, and between and against two of its main posts or legs, $e\ e$, and two standards, $f\ f$, arranged parallel to such legs, and in other respects as represented. At its rear the frame C is pivoted to one of the standards and the next post or leg, while at its front it has pivoted to it two connection-bars, $g\ g$, which, near their lower ends, are pivoted to a horizontal rocker-bar, D, provided at its center with a female screw to receive a male screw, E. This latter turns on stationary bearings $h$ $i$ at its ends, and is provided with a bevel-pinion, $k$, to engage with a bevel-gear, $l$, arranged as shown. The said gear $l$ is fixed on a short shaft, $m$, supported by two hangers, $n\ o$, and being provided on its outer end with a hand-wheel or cranked wheel $p$. On turning the wheel $p$ the screw E will be put in revolution, so as to move the saw-carrying frame in a manner either to depress or elevate the saw relatively to the table-top. A pulley, $q$, on the saw-arbor, is to receive an endless belt from a driving-wheel, $r$, fixed on a shaft, $s$, all being arranged in manner as shown in the drawing. The adjustable gauge, against which the work or "stuff" is placed and moved while being sawed, is shown at F, its lower edge resting directly upon the table-top. From the back of this gauge two semicircular or curved projections, $t\ t$, are extended, they, at their centers, being pivoted to two arms, $u\ u$, arranged as shown, and pivoted to a slide-bar, G. Two slotted curved arms, $v\ v$, extend upward from the slide-bar G, their slots being curved with radiuses whose centers are at the back pivots of the arms $u\ u$. Hooked clamp-screws $w\ w$, arranged with the projections $t\ t$, as shown, go through the arms $u\ u$ and the slots of the arms $v\ v$ and receive clamp-nuts $x\ x$. By means of the devices described the gauge F may be inclined to any desirable extent to the table-top and fastened in position, it at the same time resting on such top. The bar G is fastened upon the top of a carriage, H, which has a projection, $y$, to extend into a groove, $z$, made in the table-top at right angles with the gauge F. A clamp-screw, $a'$, and nut $b'$ serve to fasten the carriage H in any position in the groove, which is dovetailed to receive the head of the screw.

From the above it will be seen that the gauge F may not only be adjusted to any desirable inclination with respect to the table-top, but may be moved and set either nearer to or further from the saw, as occasion may require, the gauge, as before mentioned, resting directly on the table-top.

We make no claim to anything described or represented in the United States Patent No. 77,606. We also make no claim to anything, combination, or arrangement as shown in either of the United States Patents Nos. 89,518, 97,950.

Our mechanism for supporting and adjusting the saw dispenses entirely with the back frame, a pulley, and belt, and certain clamps, as set forth in the said patent 89,518. By one movement of our screw we accomplish what requires two or three operations to perform by the racks, pinions, set-screw, and clamps described in such patent. Thus we have a more simple and far preferable combination and arrangement of parts. So, in respect to our mechanism for adjusting the stuff-gauge, it differs materially from anything shown in patent 97,950, for, with our arrangement, the gauge turns on pivots separate from the clamp-screws, and each of these latter performs the functions of clamping together the parts $t$, $u$, and $v$. The gauge by our mechanism is held in position with greater security, as it has, at each end, three points of support instead of but two, as is the case with the gauge shown in patent No. 97,950.

We claim—

The pivoted frame C, the connection-bars $g$ $g$, the rocker-bar D, and the vertical screw E and its operative mechanism, when combined together and arranged in and applied to the table and saw in manner and to operate as described.

WILSON W. CAREY.
G. W. HARRIS.

Witnesses:
PERRY PUTNAM,
HENRY H. FOLSOM.